Feb. 14, 1956 N. E. LINDENBLAD 2,734,344

ELECTRIC COOLING APPARATUS

Filed May 1, 1953 3 Sheets-Sheet 1

INVENTOR.
Nils E. Lindenblad

BY Morris L. Rabkin

ATTORNEY

Feb. 14, 1956 N. E. LINDENBLAD 2,734,344

ELECTRIC COOLING APPARATUS

Filed May 1, 1953 3 Sheets-Sheet 2

INVENTOR.
Nils E. Lindenblad

BY Morris A. Robin

ATTORNEY

Feb. 14, 1956 N. E. LINDENBLAD 2,734,344

ELECTRIC COOLING APPARATUS

Filed May 1, 1953 3 Sheets-Sheet 3

INVENTOR.
Nils E. Lindenblad

BY Morris A. Robbins

ATTORNEY

1

2,734,344

ELECTRIC COOLING APPARATUS

Nils E. Lindenblad, Princeton, N. J., assignor to Radio Corporation of America, a corporation of Delaware Application May 1, 1953, Serial No. 352,473

4 Claims. (Cl. 62—1)

This invention relates to electric cooling apparatus and, more particularly, although not necessarily exclusively, to novel devices for producing cooling by means of the Peltier effect.

Various types of apparatus utilizing the Peltier effect to produce cooling have been suggested and developed for use in the past with various degrees of effectiveness. An early patent issued to M. W. Dewey, 413,136, October 15, 1889, describes such a device for use in conjunction with a refrigeration system.

In order to make the Peltier effect available for the production of cold, a thermo-pile comprising bi-metallic elements, such for example, as bismuth and antimony or other similarly acting metals having different thermo-electric powers arranged alternately is usually provided. The bi-metallic element or thermo-couple normally has two discrete portions; a cold portion and a hot portion. The cooling effect produced in a circuit at the junction of the two electrically conductive metals upon the application of a current thereto, is proportional to the current crossing the bi-metallic boundary.

A novel cascaded thermo-electric pile cooling apparatus constructed in accordance with the present invention may comprise a plurality of concentric, or linear banks of thermo-couples disposed and secured in thermal contact with each other. The cold ends of the thermo-couples constituting each bank are disposed in the direction of the area to be cooled. The individual couples are physically arranged so that their number increases successively between adjacent banks along the path of heat transport away from the cool area. Thus, the bank nearest the cool area will have the fewest number of thermo-couples. The purpose of this arrangement is to remove the extra heat produced by ohmic losses in each bank or stage. The thermal bond between banks has a high thermal conductivity and a low electric conductivity. Heat is thus carried away from the cool area progressively by means of the successively increasing numbers of thermo-couples. The area to be cooled thus has its temperature gradually but effectively lowered without regard to the starting temperature.

An object of the present invention is to provide an arrangement for cascading the members of a multi-couple thermo-electric pile so as to multiply the temperature difference obtained with a single pile.

It is a further object of the invention to provide a completely electric cooling system in which there are no conventional moving parts and in which a minimum of electric current is required.

The novel features that are considered characteristic of the invention are set forth with particularity in the appended claims. The invention itself, however, both as to its organization and method of operation as well as additional objects and advantages thereof will be best understood from the following description when read in connection with the accompanying drawings, in which:

Figures 1, 2, 3, 3A:
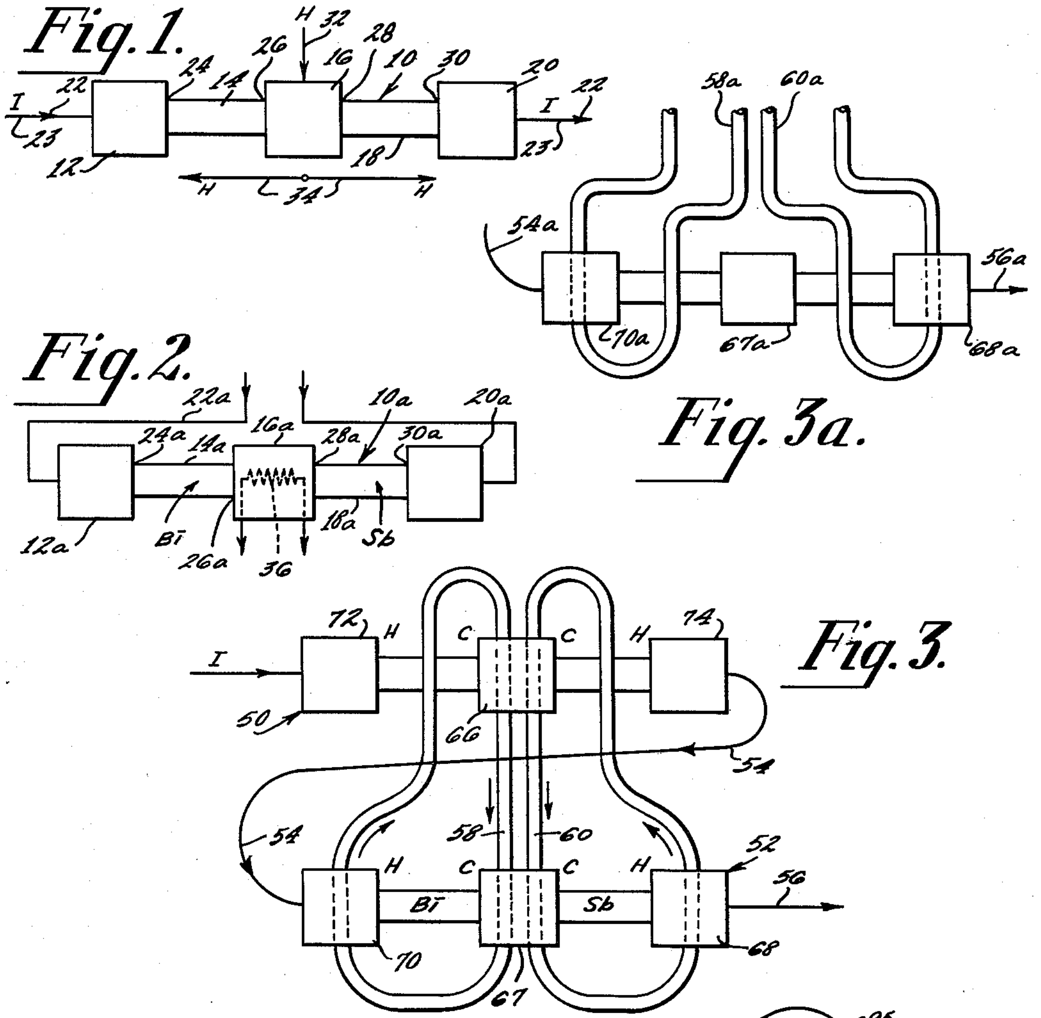
Fig. 1 is a schematic representation of a thermo-couple having features of the invention and illustrating the direction of heat flow therethrough.
Fig. 2 is a schematic diagram of a thermo-couple similar to that shown in Fig. 1.
Fig. 3 is a schematic diagram of a thermo-couple cooling arrangement of this invention and illustrating a conduit system for use therewith.
Figure 5:
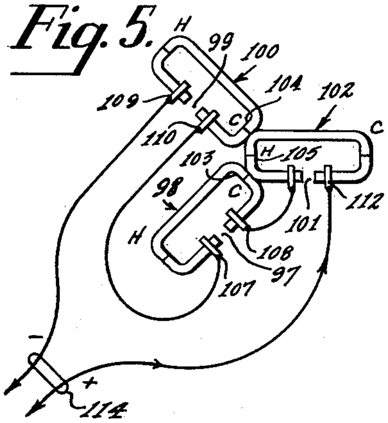
Figure 4:
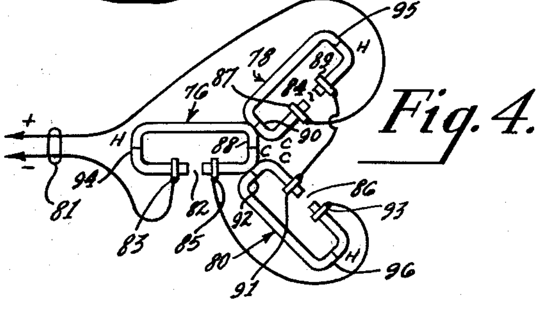
Figure 6:
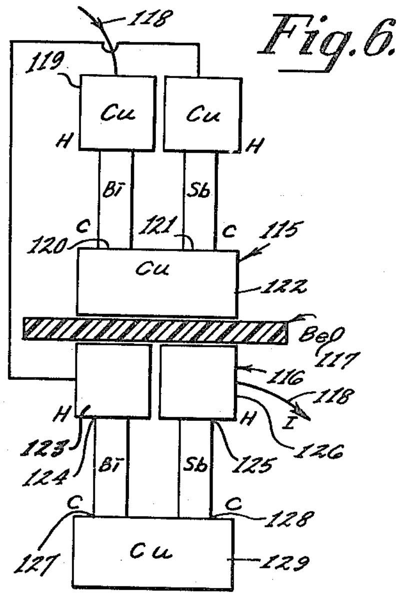
Figure 7:
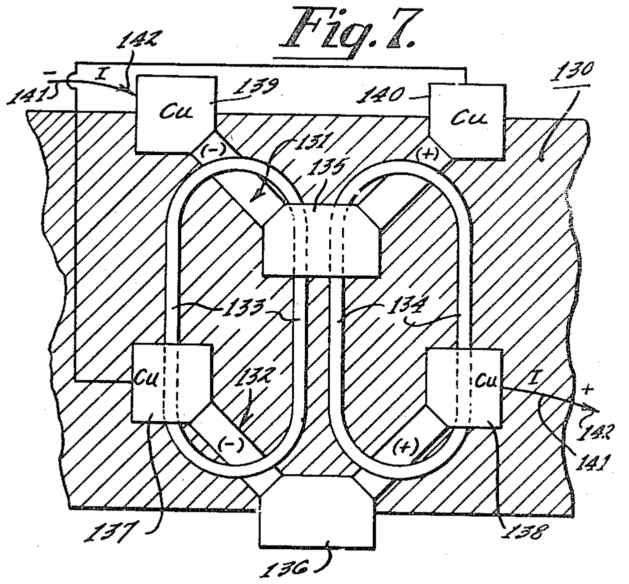
Figures 8, 9:
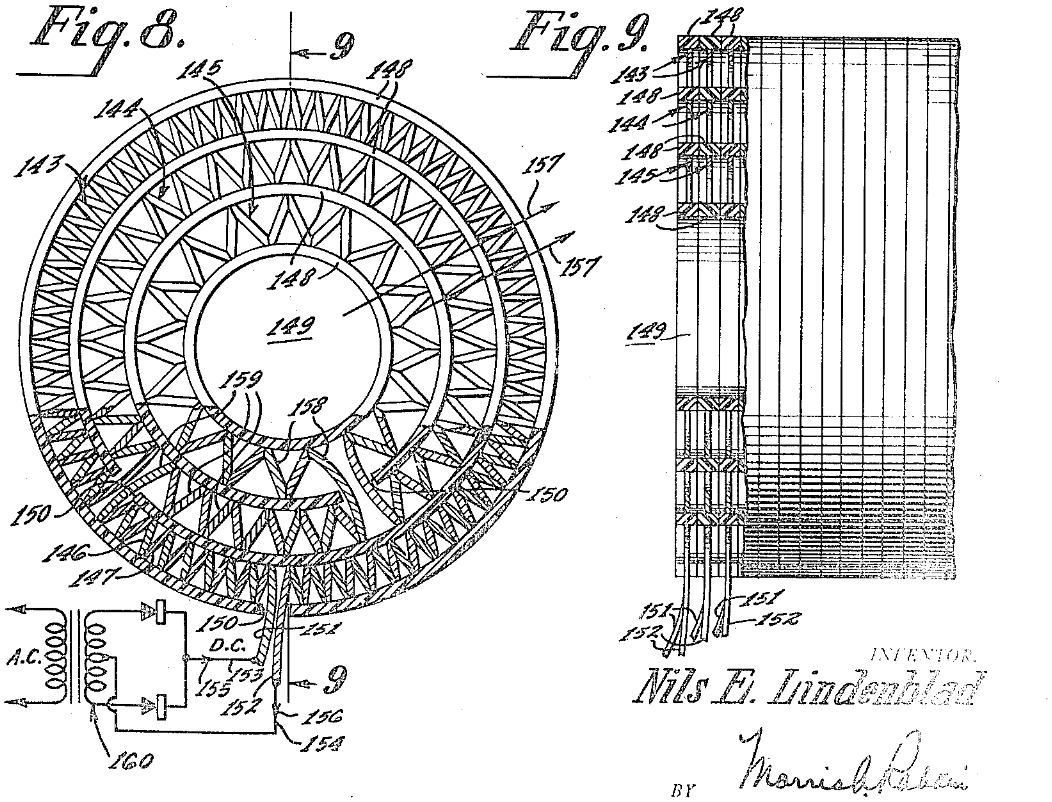

Fig. 3*a* is a fragmentary view showing a modified portion of the arrangement of Fig. 3;

Fig. 4 is a schematic diagram showing an earlier arrangement of a thermo-electric pile for cooling;

Fig. 5 is a schematic representation of an arrangement of a thermo-electric pile in accordance with this invention;

Fig. 6 is a schematic diagram showing the use of a thermo-electric pile of this invention in conjunction with a high thermal conductor-electric insulator;

Fig. 7 is a schematic diagram partially in section of one application of the present invention to interior cooling;

Fig. 8 is a schematic illustration, partially in section, of an application of the present invention to apparatus for cooling.

Figure 10:
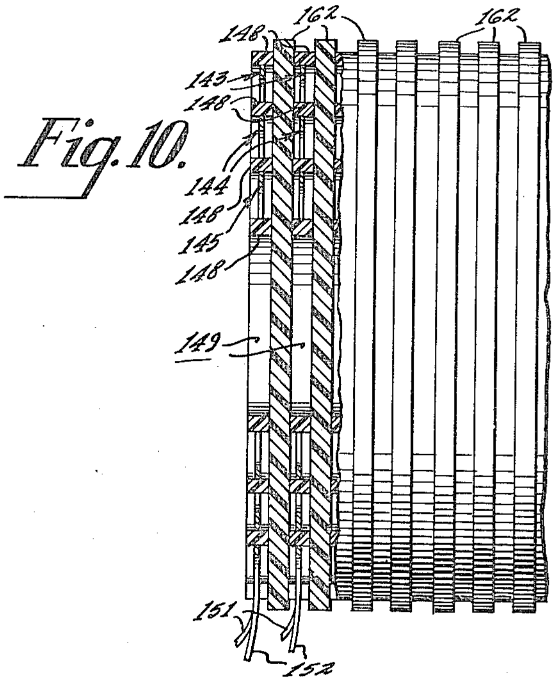
Figure 11:
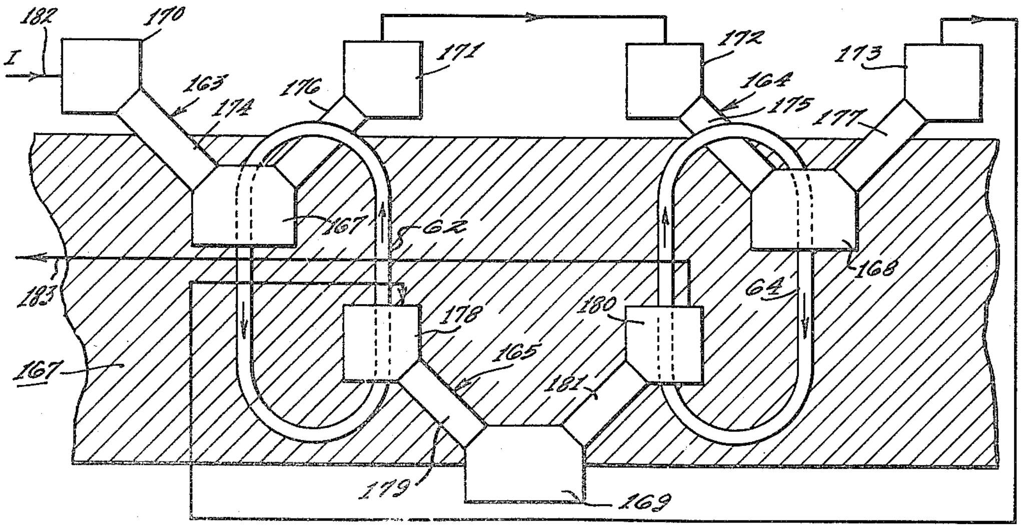

Fig. 9 is a view partially in cross section of the thermo-electric pile of this invention and the thermally conductive elements of the thermo-couples of the type shown more generally in Fig. 8;

Fig. 10 is a view in cross section showing a modified portion of the arrangement of Fig. 9; and Fig. 11 is a schematic diagram partially in section of another application of the invention to interior cooling.

If a current of electricity is caused to flow across the conductive junction of two dissimilar metals, there is either an evolution or an absorption of heat at the junction. This result stems from the fact that the two metals are at different potentials resulting from a difference in the free electron density so that an exchange of heat into work or vice versa results when the current flows from one metal to another. This may be likened to expansion and compression in the case of a gas.

Referring to Fig. 1, there is shown a schematic representation of a cooling apparatus comprising a thermo-couple 10 in which alternate members of copper 12, bismuth 14, copper 16, antimony 18 and copper 20, respectively, are conductively joined to form a unitary structure. If a current (I) is sent through the copper member 12 in the direction indicated by the arrowheads 22 on the supply conductor 23, the junction 24 of the copper and the bismuth 14 will become heated while the adjacent junction 26 between the bismuth 14 and the copper 16 will become cooled. Progressing in the righthand direction in the illustrative embodiment shown, the junction 28 between the copper 16 and antimony 18 will become cooled while the furthermost antimony 18 and copper 16 junction 30 will become heated. Thus it may be seen that a predetermined amount of heat admitted to the center copper electrode, arrow 32, will be dissipated by this cooling effect and the heat energy will be carried toward either end member 12 or 20 of the thermo-couple as shown by the arrows 34.

Fig. 2 is a schematic representation of the thermo-couple device of Fig. 1 useful for producing cooling of heated bodies. In this case a heater wire 36 has been added to the cold junction element 16 to enable measuring the cooling capacity of a thermo-couple operating as indicated in Fig. 1.

Fig. 3 represents a schematic illustration of a serially additive thermo-electric pile. In this instance, for example, two bismuth-antimony thermo-couples 50 and 52 are arranged so that the cooling effect derived from both thermo-couples may be added together to produce a greater temperature change. The horizontal arrows 54 and 56, as viewed on the drawing, illustrate the direction of the current (I) applied to the device. Two cool flow conduits 58 and 60, adapted to contain a heat transfer gas or liquid, are or may be, disposed in thermally conductive contact with the cold copper junctions 66 and 67. The conduits may take the form of pipes which pass through holes provided in the junctions 66 and 67. The conduits may be fabricated of glass in which case each portion of the two glass conduits could be sealed to a respective hole in the junctions 66 and 67 so that greater thermal conductivity is provided at the two junctions. Other material of high electrical resistivity, such for example, as stainless steel may be used to form two continuous conduits. The stainless steel conduit provides better thermal conductivity than glass and thereby offers a better cooling arrangement. The portion of the cooling produced by the cold center junction electrodes 66 and 67 of the two thermo-couples can thus be conducted circuitously back along with the heat from the hot outer junction electrodes 68 and 70 to the cold copper portion 66 of the first thermo-couple 50 to be further cooled thereby. Thus only two of the hot portions 72 and 74 are exposed to the ambient temperature.

The arrangement of Fig. 3*a* provides an alternative path for the conduits 58*a* and 60*a*. The cold junction 67*a* is effectively by-passed.

A known arrangement in which the thermo-couples are connected in circuit so that one thermo-couple can act as a baffle for another thermo-couple is shown in the schematic representation of Fig. 4. The thermo-couples 76, 78 and 80 are illustratively arranged in Y-formation for convenience only. Each thermo-couple comprises a trimetallic oblong ring structure, each having a gap 82, 84 and 86, respectively, therein. Each thermo-couple is composed of bismuth, antimony and bismuth. An electrical contact or electrode 83, 85, 87, 89, 91 and 93 is secured, to each pair of adjacent bismuth elements respectively. Application of currrent of a proper polarity from a source (not shown) over the conductors 81 activates the thermo-electric pile to thereby provide cooling. Each one of the cold junctions 88, 90 and 92 is disposed in thermally conductive contact with each other. Each one of the hot junctions 94, 95 and 96 is exposed to the ambient temperature. This arrangement tends to prevent the heat from the hot junctions from creeping over into the cold area of the adjacent thermo-couples. A barrier against heat transfer is thus provided by the cold junctions.

Greater degrees of cooling than result from known methods utilizing the Peltier effect are accomplished by the device of Fig. 5. Three tri-metallic thermo-couples 98, 100 and 102, each having a gap 97, 99 and 101 therein, respectively, are illustratively arranged so that the two cold junctions 103 and 104 are disposed in thermal contact with the adjacent hot junction 105. Current of a proper polarity from a source (not shown) is, or may be, applied to the thermo-couples 98, 100 and 102 over the conductors 114 by means of the electrodes 107, 108, 109, 110, 111 and 112. Thus it will be seen, that instead of relying upon the ambient air to absorb the heat, it is instead effectively carried away by virtue of the reduced temperature of the cold zones or junctions 103 and 104 in direct contact with the hot zone or junction 105. In other words, there is a progressive cooling by a series arrangement of devices utilizing the cooling effect.

Fig. 6 illustrates a schematic representation of one form of the invention in which the cooling effect developed by a multiple-couple thermo-electric pile is made to be serially additive. In this instance two thermo-couples 115 and 116 are disposed adjacent each other and each couple is or may be conveniently U-shaped, as shown. The physical configuration of the thermo-couples is selected as exemplary only. The thermo-couples are physically separated by a member 117 of beryllium oxide, for example. Beryllium oxide was chosen because it is a good electric insulator and at the same time is an excellent thermal conductor. In terms of metals, the heat conductivity of beryllium oxide is roughly equivalent to that of aluminum. If a current (I) from any suitable source (not shown) is applied, in the direction of the arrows, representing electrical conductors 118, to the copper member 119, the lower bismuth-copper junction 120 and the antimony-copper junction 121 will be cooled. This cooling effect is conducted through the beryllium oxide member 117 which is or may be, as before mentioned, a wall or barrier to electricity in contact with the copper member 122 of the thermo-couple 115 to the two copper members 123 and 126. The hot junctions 124 and 125 are thus partially cooled, so that the adjacent cold junctions 127 and 128 provide increased cold which is made available at the copper member 129 for use in suitable temperature reducing arrangements, such for example, as indoor room cooling.

Fig. 7 is a schematic diagram partially in section of an application of the present invention to interior cooling. For purposes of illustration only, the embodiment set forth shows a section through a panel or wall 130 of a building (not shown). Two thermo-couples 131 and 132 are disposed in the panel 130. The thickness of the panel 130 is immaterial and may vary with specific applications. Two continuous cool flow conduits 133 and 134, adapted to contain a heat transfer fluid, gas or liquid, are disposed in thermal contact with the two thermo-couples. The conduits 133 and 134 are or may be pipes which pass through holes provided in the copper members 135 and 136 and likewise in the copper members 137 and 138. Two other copper members 139 and 140 are exposed to the outside atmosphere and are adapted to extend through the wall 130. The copper member 136 is disposed to extend through the interior portion of the wall 130. Cooling is thus delivered to the interior portion of the associated building when current of a proper polarity is applied to the thermo-couples 131 and 132 over the conductors 141 in the direction indicated by the arrowheads 142.

Fig. 8 illustrates a preferred embodiment of the invention which may, for example, comprise a plurality of thermo-couples disposed and secured between concentric, cylindrical, thermally conductive and electrically insulating sleeves or rings. The thermo-couples 143, 144 and 145 comprise two dissimilar metallic elements of bismuth 146 and antimony 147. The bismuth and antimony elements are or may be bonded together at their end portions by means of soldering or welding.

For purposes of illustration only four concentric beryllium oxide sleeves or rings 148 are nested to form three concentric banks or holders for the thermo-couples 143, 144 and 145. The innermost sleeve or ring provides a cool space or container 149 which is or may be used to maintain articles to be placed therein at a reduced temperature. The thermo-couples are serially connected or cascaded in a zig-zag manner to form a plurality or series of bands around the beryllium oxide sleeves or rings. Openings 150 are provided in various ones of the beryllium oxide sleeves for interconnecting the different concentric banks or bands of thermo-couples. Each beryllium oxide sleeve is thermally conductive but electrically insulating thus providing excellent heat transfer means from one bank of thermo-couples to another bank. The number of thermo-couples increases progressively from the innermost concentric sleeve to the outermost concentric sleeve.

A source of potential 160 of proper polarity, suitably rectified, is or may be connected by means of suitable contacts or electrodes to the outermost thermo-couple elements of bismuth 151 and antimony 152, respectively.

Application of current thereto, over the conductors 153 and 154 in the direction of the arrowheads 155 and 156, will cause a heat flow to be established in the direction indicated by the arrows 157 and away from the cool space or container 149. The open lattice type structure provides ample means for circulation of air over the individual couples of the pile. The hot ends 158 of each one of the couples in the thermo-couple bank nearest to the cooled space 149 give off heat to the cool ends 159 of each one of the couples in the next adjacent bank of thermo-couples. This latter bank can absorb the heat thus dissipated effectively by virtue of its greater number of thermo-couples. The procedure repeats itself toward the next adjacent bank in succession which has a still greater number of thermo-couples. In this way a gradient and a heat flow is established. Each thermo-couple bank will produce its share of the total temperature difference and the mean temperature between the cool ends and the hot ends in any bank will be that corresponding to its location in the total gradient pattern. By means of effective heat exchange (not shown) at the final hot end of the system, this end can be kept near ambient temperature. The cool end will then drop below ambient to the extent determined by the thermo-couple material, the electron current and the number of stages or cascaded banks of thermo-couples.

A number of cascaded thermo-electric piles may be fabricated in the form of thin disks, such for example, as the disks 148. The disks may be stacked or joined as illustrated in Fig. 9, to provide a hollow container into which products to be cooled may be disposed. Suitable current connections are secured to the bismuth elements 151 and the antimony elements 152, respectively. Since the thermo-couples are small and occupy only a limited portion of the space between the concentric sleeves, a circulation of air can take place through the disks. Further cooling can thus be achieved.

In Fig. 10 is shown an arrangement similar to that shown in Fig. 9, where layers 162 of a thermally conductive and electrically insulating material are positioned between disks 148. The insulating layers may be made of the same material, beryllium oxide, as the rings 148. Parts of Fig. 10 similar to those shown in Fig. 9 are designated by the same reference characters. The insulating layers effectively electrically insulate the thermo-couples within one disk from those within the next disk.

In order to provide greater heat transfer, the device of Fig. 11 may be used. Three thermo-couples 163, 164 and 165 similar in structure to the thermo-couples of Fig. 7 and comprised of the same metallic elements as the couples of Fig. 7 are disposed in a panel or wall 166 of a building (not shown). Two cool flow conduits or pipes 62 and 64 similar to the cool flow conduits of Fig. 7 are adapted to pass through holes provided in the cold junction 167, 168 and the hot junctions 178 and 180. Since the heat from the hot junctions 178 and 180 tends to rise, the conduits 62 and 64 can carry the heat to the cold junctions 167 and 168. Added cooling is thus provided for the cold junction 169. The copper members 170, 171, 172 and 173 are adapted to protrude externally of the panel 166, into the outside atmosphere. The bismuth members 174 and 175 connect the members 170 and 172 to the cold junction 167 and 168, respectively. The antimony members 176 and 177 connect the copper members 171 and 173 to the cold junction 167 and 168, respectively. The copper member 178 is joined to the cold junction 169 by means of a bismuth member 179. The copper member 180 is joined to the cold junction 169 by means of the antimony member 181. Current (I) is or may be applied to the member 170 over the conductors 182 and 183. The conductors 182 and 183 are adapted to serially connect the members 170, 171, 172, 173, 178 and 180. The cold junction 169 is disposed to protrude or extend through the wall 166 into the inside of the building thereby to provide means for providing cooling.

There has thus been described a novel temperature cascaded thermo-electric pile for refrigeration purposes in which the temperature obtained in a single pile is multiplied repeatedly to produce effective cooling.

What is claimed is:

1. A cascaded thermo-electric pile for cooling by means of the Peltier effect comprising a plurality of concentric cylindrical annular members, each of said members being thermally conductive and electrically insulating, a plurality of thermo-couples, each of said thermo-couples having a hot end and a cold end, said thermo-couples being disposed in concentric banks within said members, said thermo-couples being disposed in thermal contact with said members radially in alternately hot and cold end arrangement, said banks comprising progressively increasing numbers of said thermo-couples, and means to energize said thermo-couples whereby to produce cooling in response to energization of said cascaded thermopile.

2. The invention according to claim 1 wherein said annular members are constituted of beryllium oxide.

3. A thermo-electric cooling structure comprising a plurality of disks stacked one above another, each of said disks being comprised of a plurality of anular rings, a plurality of thermo-couples joined together to form a serially-connected chain disposed in a zigzag manner within each of said annular disk compartments, said thermo-couples being disposed with their cold junctions in thermal contact with the innermost ring of said compartment and their hot junctions in thermal contact with the outermost ring of said compartment, and means for passing a current through said serially-connected thermo-couples to produce a cooling effect within the center of said stack of disks.

4. A structure for pumping heat by means of the Peltier effect comprising a plurality of layers each including a plurality of annular rings providing annular compartments therebetween, said rings being thermally conductive and electrically insulating, said annularly compartmented layers being stacked one above another to provide a central enclosure within said stacked layers, a plurality of dissimilar thermo-electric elements bonded together at their ends to provide a series-connected chain, said series connected elements being arranged in a zigzag manner within said annular compartments to provide cold junctions disposed adjacent said innermost ring of each annular compartment and hot junctions disposed adjacent said outermost ring of each annular compartment, the number of said thermo-couples increasing progressively from the innermost compartments to the outermost compartments, and means for passing an electric current through said series connected thermo-couples whereby heat is pumped from said enclosure radially outward through said annular compartments.

References Cited in the file of this patent

UNITED STATES PATENTS

| | | |
|---|---|---|
| 773,838 | Wightman | Nov. 1, 1904 |
| 941,826 | Taylor | Nov. 30, 1909 |
| 1,120,781 | Altenkirch et al. | Dec. 15, 1914 |
| 1,804,072 | Turrettini | May 5, 1931 |
| 1,818,437 | Stuart | Aug. 11, 1931 |